March 19, 1963 T. C. WARD 3,082,330

GENERATING ARBITRARY VARYING-AMPLITUDE STEP-WAVE USING DISTRIBUTOR HAVING SEPARATE CHANNEL INDIVIDUAL TO EACH SUCCESSIVE STEP

Filed July 25, 1958 3 Sheets-Sheet 1

INVENTOR.
THOMAS C. WARD
BY FULWIDER, MATTINGLY & HUNTLEY
ATTORNEYS

INVENTOR.
THOMAS C. WARD
BY FULWIDER, MATTINGLY & HUNTLEY
ATTORNEYS

March 19, 1963 T. C. WARD 3,082,330

GENERATING ARBITRARY VARYING-AMPLITUDE STEP-WAVE USING DISTRIBUTOR HAVING SEPARATE CHANNEL INDIVIDUAL TO EACH SUCCESSIVE STEP

Filed July 25, 1958 3 Sheets-Sheet 3

INVENTOR.
THOMAS C. WARD
BY FULWIDER, MATTINGLY & HUNTLEY
ATTORNEYS

United States Patent Office
3,082,330
Patented Mar. 19, 1963

3,082,330

GENERATING ARBITRARY VARYING-AMPLITUDE STEP-WAVE USING DISTRIBUTOR HAVING SEPARATE CHANNEL INDIVIDUAL TO EACH SUCCESSIVE STEP

Thomas C. Ward, Encinitas, Calif., assignor to Kinetics Corporation, Solana Beach, Calif., a corporation of California Filed July 25, 1958, Ser. No. 750,964
7 Claims. (Cl. 307—88.5)

The present invention relates to electronic switching systems, and more particularly to a static commutator means for combining a plurality of component signals into a single signal which sequentially contains the component signals.

In communication systems, a number of separate information signals are sometimes transmitted over a single communication channel. One method commonly employed to transmit plural signals over a single communication channel is to allow the individual signals to share the channel of communication on a time basis. That is, the communication channel carries a composite signal consisting of the different individual component signals in sequence. A communication system which transmits and receives a composite signal formed of plural time-sharing component signals must compound and separate the component signal. For example, these communication systems may include a commutator apparatus for sequentially sampling plural individual component signals, and thereby combining these signals into a single time-shared composite signal that may be transmitted over a communication channel.

Prior to the present invention, commutators have, in general, been large in size, heavy, or not capable of reliable operation over extended intervals. Current applications for commutator systems are often in remote, unattended, or airborne locations as missiles; therefore, reliability, light weight, and small volume are extremely important considerations.

The present invention comprises a static commutator which employs solid-state elements to provide a light-weight, small apparatus capable of reliable operation over extended time intervals. A plurality of binary circuits, i.e. two-state circuits, are interconnected as a ring counter, whereby a single binary circuit is in an exclusive state, and the individual binary circuits progressively become that circuit. A plurality of transistor switches are individually-connected to the binary circuits and are thereby controlled to sequentially pass a signal to a common output circuit. The static commutator of the present invention may be constructed so that the output circuit is at a reference potential between the sequential signals. Furthermore, plural groups of transistor switches may be controlled by a single group of binary circuits to provide a plurality of commutators.

A major object of the present invention is to provide an improved static commutator means.

Another object of the present invention is to provide a static commutator means of relatively light weight and small size.

A further object of the present invention is to provide a solid-state commutator which is capable of reliable operation over extended intervals of time.

A still further object of the present invention is to provide a static commutator for forming a composite electrical signal which comprises samples of a plurality of different signals, and wherein the individual signals in the composite signal may be readily identified.

A still further object of the present invention is to provide a plurality of static commutators which include certain common circuitry to effect economy in size and cost.

Yet another object of the present invention is to provide a solid-state electronic commutator means including an improved switching circuit controlled by a binary circuit to accurately sample an information signal.

These and other objects and advantages of the present invention will become apparent from the following detailed description, when taken in conjunction with the appended drawings, wherein.

Figure 1:
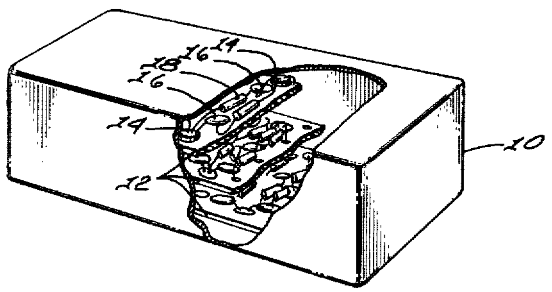
FIGURE 1 is a sectionalized perspective view of a static commutator embodying the present invention.

Referring to the drawings, and particularly to FIGURE 1 thereof, there is shown a housing 10 containing a plurality of spaced-apart printed-circuit boards 12 supported by spacers, on bolts (not shown) which are positioned inside the enclosure 10. The printed-circuit boards 12 carry electrical connectors and support electrical elements, including transistors 14, condensers 16, and resistors 18. By embodying the system of the present invention in a structural arrangement as shown in FIGURE 1, it is possible to reduce the housing 10 to a size in which the largest dimension is less than the length of a common pencil.

Figures 2, 4A:
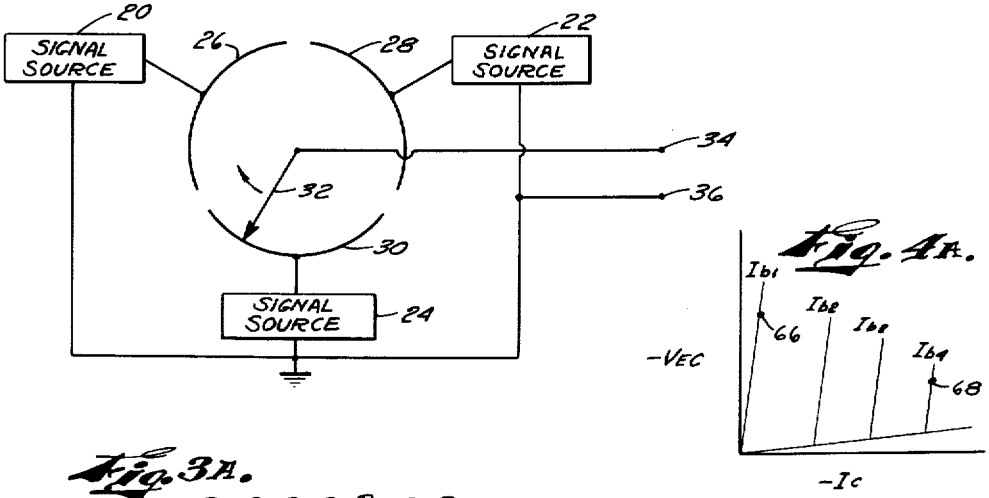
FIGURE 2 is a diagrammatic representation of an electrical commutator system.
FIGURE 4A is a graph illustrating the characteristics of the transistor of FIGURE 4.

Reference will now be had to FIGURE 2 for a general consideration of the operation of an electrical commutator system. There are shown signal sources 20, 22 and 24 which may comprise various devices for providing an amplitude-modulated signal indicative of intelligence. The signal sources 20, 22 and 24 are individually connected between ground and ring-forming commutator segments 26, 28 and 30 respectively. A rotary contact 32 is mounted for rotation about the axis of the ring formed by the commutator segments, so that the contact sequentially engages the segments. The rotary contact 32 is connected to a terminal 34 which, with a grounded terminal 36, is adapted to be connected to an output circuit.

In the operation of the rotary commutator of FIGURE 2, the rotary contact 32 is moved to sequentially engage the commutator segments 26, 28 and 30, thereby connecting the terminal 34 to sequentially receive signals from the signal sources 20, 22 and 24. A composite signal therefore appears across the terminals 34 and 36, which composite signal is formed of the component signals from signal sources 20, 22 and 24.

The composite signal appearing across the terminals 34 and 36 may be transmitted over a communication channel to a remote receiver which may include a commutator somewhat similar to that shown in FIGURE 2, or other means, for segregating the individual component signals. Thus, it may be seen that a plurality of amplitude-modulated signals (each indicative of different information) may be transmitted over a single channel of communication by allowing the signals to share the communication channel on a time basis.

Figure 3A:
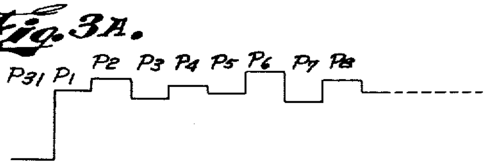
FIGURE 3A is a wave form illustrative of the operation of the system of FIGURE 3.
Figure 3:
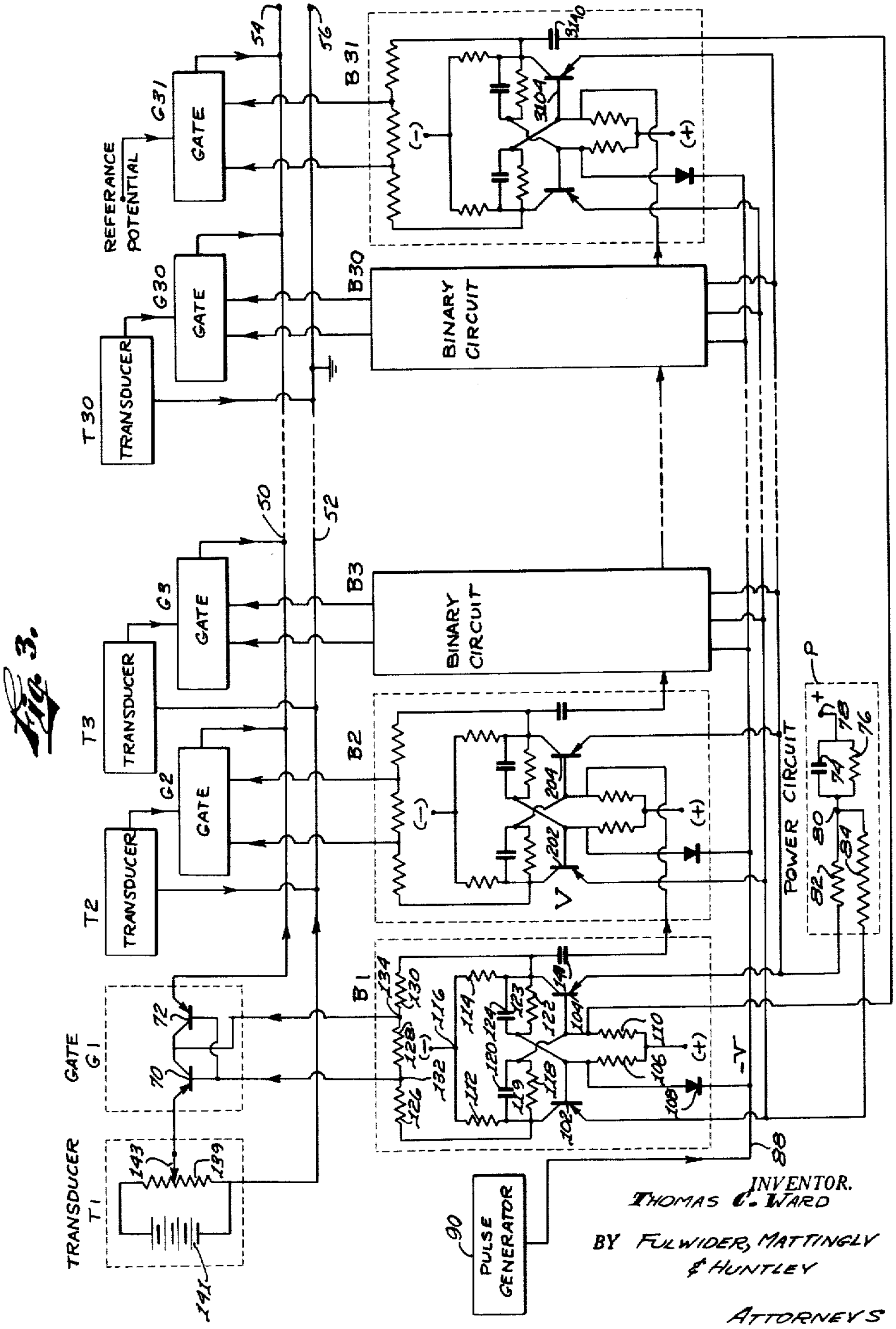
FIGURE 3 is a diagrammatic representation of a static commutator system embodying the present invention.

Reference will now be had to FIGURE 3 which illustrates a static commutator embodying the principles of the present invention. FIGURE 3 shows a representation of a plurality of binary circuits B1 through B31 which have two stable states and are interconnected (as will be hereinafter described) so that all but one of the circuits are in the same state. The interconnected binary circuits are controlled so that the one circuit, in an exclusive state, progressively becomes the different binary circuits in the numerical sequence by which these circuits are identified.

Each of the binary circuits B1 through B31 are individually-connected to gate circuits G1 through G31 respectively. The gate circuits G1 through G31 are transistor switches, and will be described in greater detail hereinafter along with an explanation of the manner in which the gate circuits are controlled by the binary circuits. However, in the operation of the system, the single gate circuit connected to the binary circuit which is in the exclusive state is closed, whereas the other gate circuits are all open. Therefore, as the exclusive state progressively moves through the group of binary circuits B1 through B31, the gate circuits are individually and sequently closed to permit samples of component signals to pass to a common circuit.

The component-signals to each of the gate circuits G1 through G30 are provided by transducers T1 through T30 which are individually connected to similarly-numbered gate circuits. The gate circuit G31 is connected to a source of reference potential. The outputs of all of the gate circuits G1 through G31 are connected to a common output conductor 50. A grounded output conductor 52, connected to the transducers, forms an output circuit for the commutator in conjunction with the conductor 50. Terminals 54 and 56 (connected to the conductors 50 and 52, respectively) provide means for connecting the commutator to an output apparatus.

The transducers T1 through T30 may comprise various devices for providing a signal that is amplitude-modulated to represent intelligence, e.g. an accelerometer, or a scintillation detector. The component signals from the transducers are normally continuous; therefore, as the gate circuits G1 through G31 are progressively closed, the component signals are sequentially applied across the conductors 50 and 52 and may be connected to an output apparatus through terminals 54 and 56. As a result, the signal appearing across the terminals 54 and 56 comprises a composite signal which is time-shared by component signals that are indicative of information. An example of the composite signal appearing across terminals 54 and 56 is illustrated by the waveform of FIGURE 3A, in which time periods P1 through P8 indicate the intervals during which individual gate circuits identified by similar numbers are closed.

In the operation of the system of FIGURE 3, assume initially that the gate circuit G31 closes for an interval P31 during which the terminal 54 is connected to the source of reference potential through gate G31, to provide a marker for the identification of the component signals which follow. At the expiration of the interval P31, the gate circuit G31 opens and simultaneously the gate circuit G1 closed to connect the transducer T1 to the terminal 54, thereby providing a signal to the terminal 54, during the interval identified as P1 in FIGURE 3A. The opening of the gate circuit P31 and closing of the gate circuit P1 results from the exclusive state of the binary circuits changing from the binary circuit B31 to the binary circuit B1. Following the interval P1, the gate circuits G2 through G30 are closed in sequence to connect the transducers T2 through T30 to the conductor 50 during intervals P2 through P30 to thereby formulate the composite signal of the waveform in FIGURE 3A. This cycle of operation then repeats to formulate a recurring composite signal indicative of the intelligence from the transducers.

Preliminary to a detailed consideration of the individual circuits in the system of FIGURE 3, the operation of a transistor as employed in these circuits will be considered.

Figure 4:
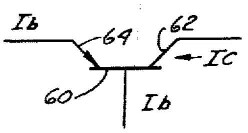
FIGURE 4 is a diagrammatic representation of a transistor of the type which may be employed as a switch element in an embodiment of the present invention.

FIGURE 4 shows a PNP junction transistor having a base electrode 60, a collector electrode 62 and an emitter electrode 64. FIGURE 4A is a graphic representation of the operating characteristics of a junction transistor as represented in FIGURE 4. In the curves of FIGURE 4A, the voltage $V_{ec}$ indicates the voltage of the emitter electrode 64 relative to the collector electrode 62, and is plotted as ordinant. The current $I_c$, passing through the collector element 80 is plotted as abscissa, and the current $I_b$, passing through the base electrode 60 of the transistor, is constant for various curves. Thus, the curve $I_{b1}$ indicates the operating characteristic of the transistor when the current through the base electrode 60 is maintained at a particular value, which may be near zero.

If the transistor is operated upon the curve $I_{b1}$ a certain value of voltage $V_{ec}$ causes the transistor to operate at a point 66 on the curve $I_{b1}$, at which point sizeable variations in the voltage $V_{ec}$ may occur with little effect upon the current $I_c$. This fact is indicated in the graph of FIGURE 4A because the curve $I_{b1}$ is nearly parallel to the zero-current reference line of the graph, i.e. the Y axis.

It may, therefore, be seen that during an interval when the transistor is operated at point 66, it comprises essentially an open circuit, and large increases in the voltage $V_{ec}$ are accompanied by very small increases in current.

The current $I_b$ through the base electrode 60 of the transistor may be changed to operate the transistor on the curve $I_{b4}$, for example, at a point 68 at which large variations in the current $I_c$ will have little effect upon the voltage $V_{ec}$. Thus, the transistor may now be seen to act essentially as a short circuit, offering very little resistance to the passage of an electrical current.

The graph, shown in FIGURE 4A, and the mode of operation described above, is similar for both NPN and PNP junction transistors; however, the direction-of-flow of currents differ in the different types of transistors.

From the above, it may be seen that a transistor, as shown in FIGURE 4, may be effectively operated as an electronic switch simply by varying the current $I_b$ which passes through the base electrode 60, to thereby control the resistance presented between the emitter and the collector electrodes. However, in a transistor switch using a single transistor, signals of only one polarity may be blocked. For example, a PNP junction transistor can block a current only if the base is more positive than both the collector and the emitter electrodes. However, if two transistors are serially connected, collector-to-collector, in a manner as shown by the transistors in the gate circuit G1 of FIGURE 3, voltage fluctuations in either direction from a reference voltage may be blocked when the transistors are biased to a closed state. Therefore, transistors connected as shown in FIGURE 3, i.e. common-connected collector and base electrodes, comprise a bipolar electronic switch controlled by the current $I_b$.

A more detailed consideration of the operation of transistors as electronic switches appears in "Communication and Electronics" a publication of the American Institute of Electrical Engineers for March 1955.

The binary circuits in the system of FIGURE 3, employ junction transistors and will now be considered in detail. Each of the binary circuits B1 through B31 forming the ring counter are similar and a number of these circuits are shown in detail only to illustrate the mode of connection between the circuits.

The binary circuits B1 through B31 are connected to positive voltage through a power circuit P, which includes a condenser 74 and a resistor 76, connected in parallel between a terminal 78 (adapted to receive a positive voltage) and a junction point 80. Resistors 82 and 84 are both connected to the terminal 80 and each of these resistors supplies different portions of the binary circuits. The resistor 84 has considerably more resistance than resistor 82. For example, in the present embodiment, the resistor 84 is approximately 31 times higher in value than the resistor 82. The difference in the value of the resistors 82 and 84 is provided because the resistor 82 passes current only to a single conducting transistor in the exclusive-state binary circuit; whereas the resistor 84 provides current to conducting transistors in all of the other binary circuits in the common state.

Referring now to the binary circuit B1 in detail, the circuit includes transistors 102 and 104. The emitter electrode of the transistor 102 is connected to the resistor 84 and the emitter electrode of the transistor 104 is connected to the resistor 82. The base electrode of the transistor 102 is connected through a resistor 106 to a source of positive biasing potential and through a diode 108 to a conductor 88 which is connected to a generator 90 of negative-going pulses. The base electrode of the transistor 104 is connected through a resistor 110 to the source of positive biasing potential. The collector electrodes of the transistors 102 and 104 are also connected through resistors 112 and 114 respectively, to a terminal 116 which is adapted to be connected to a source of negative potential.

The collector electrode of the transistor 102 is connected through a parallel circuit 119, including the resistor 118 and a condenser 120, to the base of the transistor 104. Similarly, the collector electrode of the resistor 104 is connected through a parallel circuit 123 (including a resistor 122 and a condenser 124) to the base electrode of the transistor 102.

The binary circuits B1 through B31 have two stable states. During one stable state, the transistor 102 is conducting between collector and emitter electrodes and the transistor 104 is cut off between similar electrodes. The other stable state (the exclusive state) of the binary circuit exists when the transistor 104 conducts between the collector and emitter electrode and the transistor 102 is cut off between similar electrodes.

The operation of the binary circuit may best be considered by assuming initially that the transistor 104 is conducting (between emitter and collector electrodes) and the transistor 102 is cut off; and, furthermore, that a negative pulse appears on the conductor 88 from the generator 90, to effect a change-in-state of the binary circuit. The negative pulse is applied to the base electrode of the transistor 102 through the diode 108 and drives the transistor 102 into conduction between the collector and emitter electrodes. This conduction causes the collector electrode of the transistor 102 to become more positive in voltage, which voltage is coupled through the coupling circuit 119 to the base of the transistor 104, causing the transistor 104 to become less conductive between the emitter and collector electrodes. The reduction in current through the transistor 104 causes the voltage at the collector electrode thereof to become more negative, which voltage is coupled through the coupling circuit 123 to the base electrode of the transistor 102. It may, therefore, be seen that the effect of the negative pulse supplied to the base of the transistor 102 is accumulative, and causes the transistor 102 to conduct, while the transistor 104 is cut off, between collector and emitter electrodes. The state of the transistor binary circuit is returned to that initially assumed, by application of a negative pulse to the base electrode of the transistor 104, in the same manner as explained above. The sequential changes-in-state in the binary circuits B1 through B31 are effected by negative pulses from a pulse generator 90 applied to the conductor 88 and the manner of interconnection between the binary circuits. For example, the collector electrode of the transistor 104 is connected through a condenser 140 to the base electrode of a similar transistor 204 in the binary circuit B2. The binary circuits are thus interconnected throughout to form a ring counter, the last binary circuit B31 having a transistor 3104 with a collector connected through a capacitor 3140 to the base electrode of the transistor 104, in the binary circuit B1. In considering the manner in which the binary circuits are operated as a ring counter assume that the binary circuit B1 is in a state wherein the transistor 104 is conducting so that binary B1 is in the exclusive state. Upon the occurrence of a pulse from the pulse generator 90, the condition or state of the binary circuit B1 is reversed (as was previously described) during which operation the collector electrode of the transistor 104 is driven more negative. The negative-going voltage at the collector electrode of the transistor 104 is applied through the condenser 140 (as a negative pulse) to the base electrode of the transistor 204. As a result, the transistor 204 (formerly cut off) is driven into conduction with the result that the transistor 202 is cut off. It may, therefore, be seen that the exclusive state, e.g. in which the right transistor is conducting, is stepped through the ring counter.

The collector electrodes of the transistors 102 and 104 are interconnected through serially-connected resistors 126, 128 and 130. A junction point 132 (between the resistors 126 and 128) is connected to the base electrode of transistors 70 and 72, and a junction point 134 (between the resistors 128 and 130) is connected to the collector electrode of the transistors 70 and 72. When the binary circuit B1 is in a state wherein the transistor 104 is conducting, the collector electrode of the transistor 104 is more positive than the collector electrode of the transistor 102; therefore, the junction point 134 is more positive than the junction point 132 with the result that the collector electrodes of both the transistors 70 and 72 are more positive than the base electrodes. Therefore, the transistors 70 and 72 provide a closed switch (being operated essentially at the point 68 of the curve of FIGURE 4A).

When the binary B1 is in the other stable state, i.e. with the transistor 102 conducting and the transistor 104 cut off, the collector electrode of the transistor 102 is more positive than the collector electrode of the transistor 104; therefore, the junction point 132 is more positive than the junction point 134 with the result that the bases of the transistors 70 and 72 are more positive than the collectors resulting in the gate circuit G1 presenting an essentially open circuit.

As previously indicated, the gate circuits G1 through G31 are individually progressively qualified i.e. operatively closed to pass signals, and connect the signals from the transducers T1 through T30 to the conductor 50.

The transducers may take various forms, one of which is illustrated in detail in transducer T1. A potentiometer 139 is serially connected with a battery 141. The tap 143 of the potentiometer is variously positioned in accordance with an observed phenomenon, e.g. heat. Therefore, an analog signal appears at the tap 143 to be applied to the emitter electrode of the transistor 70.

The progressive individual qualification of the gate circuits G1 through G31 is effected by the binary circuits progressively and individually going into a state in which the transistor 104 is conducting to qualify an associated gate. Therefore, the gate circuits G1 through G31 individually pass signals in a sequence to thereby connect the transducers T1 through T30 to the output terminals 54 and 56. During the interval when the gate circuit G31 is qualified, reference potential appears across the output terminals 54 and 56 to indicate that the following sample of an information signal is the signal from the transducer T1.

Figure 5A:
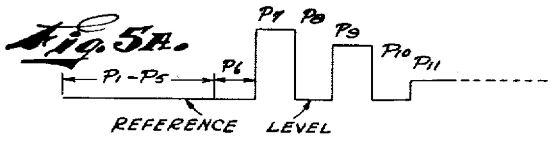
FIGURE 5A is a waveform illustrative of the operation of the system of FIGURE 5.
Figure 5:
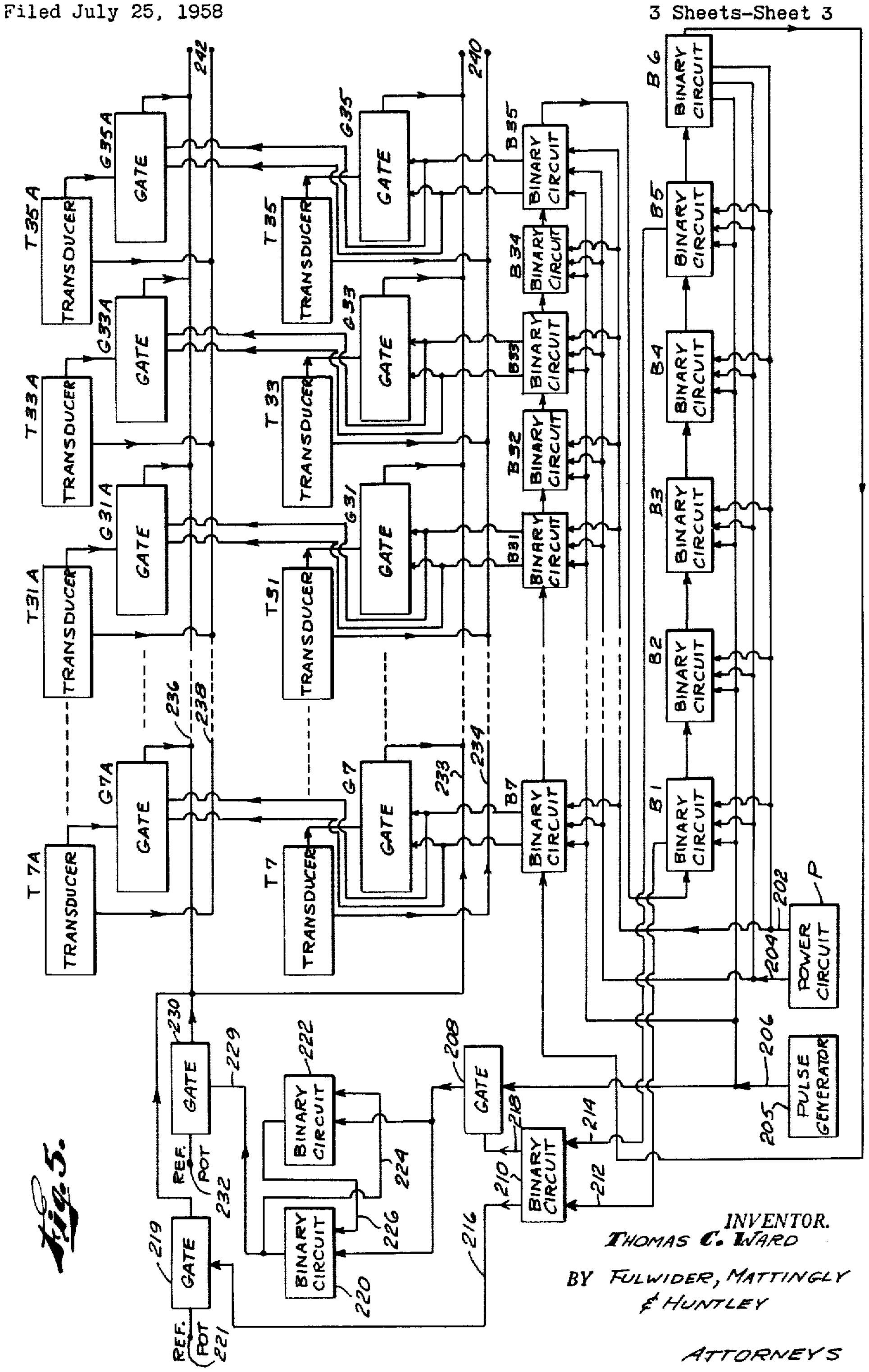
FIGURE 5 is a diagrammatic representation of an alternative static commutator system embodying the present invention.

In certain situations it is desirable to form a composite signal for transmission over a single channel of communication by combining individual component signals in a sequential fashion so that the composite signal returns to a reference level after each sample of a component signal. This mode of operation avoids interaction at the borders between component signals and, furthermore, clearly defines the individual component signals. A waveform of a composite signal which returns to a reference level after each sample of a component signal is shown in FIGURE 5A and may be seen to be divided into intervals P1 through P10, each indicative of the period timed by a binary circuit. A system for producing a composite signal as shown in FIGURE 5A is shown in FIGURE 5. Additionally, the system of FIGURE 5 illustrates an embodiment of the present invention wherein a plurality of composite signals are formed by several groups of gate circuits, all of which are controlled by a single set of binary circuits. Furthermore, the system of FIGURE 5 illustrates a variation of the present invention in which the component signals in a composite signal may be more readily identified.

Preliminary to a consideration of the system of FIGURE 5, it is to be noted that the system is represented by blocks identified as various circuits. Those blocks which carry an identification similar to circuits previously described with respect to FIGURE 3 are similar, and, therefore, require no further explanation.

In FIGURE 5 there are represented binary circuits B1 through B35 which are interconnected in a manner similar to the binary circuits in FIGURE 3, to form a ring counter. The binary circuits B1 through B35 in FIGURE 5 are connected through lines 202 and 204 to a power circuit P which provides a positive operating voltage. The binary circuits B1 through B6 are connected to a pulse generator 205 through a line 206 whereby an exclusive state is progressively stepped through these binary circuits as previously described. The conductor 206 is also connected to a gate circuit 208 which is connected to receive a signal from a binary circuit 210. The binary circuit 210 and the gate circuit 208 may be a form previously described, or alternative forms of these circuits are shown and described in United States Patent 2,769,971, issued November 6, 1956, to C. J. Bashe.

Upon the occurrence of a pulse on either of the inputs to the binary circuit 210, the circuit assumes a state wherein the two-state voltage on coinciding output conductor goes high. It is to be understood that the output voltages from the binary circuit 210 are essentially two-state voltages, and, therefore, are either high or low in accordance with the state of the binary circuit.

The input conductors 212 and 214 to the binary circuit 210 are connected respectively to the binary circuits B1 and B5 and carry high two-state signals when the associated binary circuit is in the exclusive state. Therefore, the output conductor 216 from the binary circuit 210 provides a high value of the two-state voltage during the interval when the exclusive state is passed through the binary circuits B1 through B5, and, thereafter, the output conductor 218 from the binary circuit 210 provides a high two-state voltage.

The conductor 218 from the binary circuit 210 provides a low voltage to the gate circuit 208 during the intervals P1 through P5. After the interval P5, the conductor 218 receives a high voltage thereby qualifying the gate 208 to pass pulses from the pulse generator 205 to binary circuits 220 and 222.

The binary circuits 220 and 222 are interconnected in a fashion whereby the circuits are always in different states during stable conditions. That is, the output from the binary circuit 220 is connected through a conductor 224 to the input of the binary 222; and the output from the binary 222 is connected through a conductor 226 to the input of the binary circuit 220. As a result, each occurrence of a pulse from the gate circuit 208 reverses the states of the binary circuits 220 and 222 and their states are opposite during each period P.

The output from the binary circuit 220 is applied through a conductor 229 to a gate circuit 230 which is also connected to a source of reference potential applied at a terminal 232. The output from the gate circuit 230 is applied to two groups of gate circuits, G7 through G35 and G7A through G35A. Each of the groups of gate circuits G7 through G35 and G7A through G35A is similar to gate circuits G1 through G30 of FIGURE 3. Furthermore, each of the groups of gate circuits is connected in parallel to the binary circuits B7 through B35 in a manner similar to the circuits in FIGURE 3, whereby one gate circuit in each of the groups is qualified or conductive as a closed switch during each interval P. The particular gate circuit which is conductive is varied in a sequential fashion in accordance with the numerical designations of the gate circuits. The gate circuits G7 through G35 are connected to transducers T7 through T35 to couple these transducers to conductors 233 and 234 sequentially. Similarly, the gate circuits G7A through G35A are connected to the transducer circuits T7A through T35A to couple these transducer circuits to conductors 236 and 238 in a sequential fashion. The conductors 233 and 234 are connected across terminals 240 at which one composite signal appears, and the conductors 236 and 238 are connected to the terminals 242 at which a second composite signal appears.

It is to be noted that there are no even-numbered gate circuits in the two groups of gate circuits; therefore, the even-numbered binary circuits are not connected to any gate circuits. The even-numbered binary circuits serve to provide a delay interval between component signals, as shown in the waveform of FIGURE 5A, during which reference potential appears at the terminals 240 and 242. The reference potential is applied to the terminals 240 and 242 through the gate circuit 230.

The operation of the system of FIGURE 5 may be best understood by considering the circuit to be in a particular state and explaining a portion of the complete operating cycle. Assume initially, that the binary circuit B1 is in the exclusive state, and, that the pulse generator 205 is providing pulses, furthermore, that the binary circuit 220 has been set in a state wherein the output voltage is in a high state.

The fact that the binary circuit B1 is in the exclusive state causes the two-state voltage in the conductor 212 to be high, thereby setting the binary circuit 210 in a state wherein the conductor 216 receives a high two-state voltage which qualifies the gate circuit 219 thereby allowing the reference potential, applied at the terminal 221, to appear at the terminals 240 and 242. The reference potential applied at the terminal 221 is indicated in the waveform of FIGURE 5A during the intervals P1 through P6.

Upon the appearance of a pulse from the pulse generator 205 in the conductor 206, the binary circuit B1 is returned to the common state while the binary circuit B2 is placed in the exclusive state. The next three pulses from the pulse generator 205 effectively shift the exclusive state through the binary circuits B2, B3, B4 into binary circuit B5.

When the binary circuit B5 assumes the exclusive state, the two-state voltage at the output from the binary circuit B5 becomes high to alter the state of the binary circuit 210. As a result, the two-state voltage in the conductor 216 becomes low, inhibiting the gate circuit 219 and isolating the reference potential applied at the terminal 221 from the terminals 240 and 242.

The change in state of the binary circuit 210 causes the two-state signal in the conductor 218 to go to a high value, thereby qualifying the gate circuit 208 and allowing pulses to pass through the gate circuit 208 from the pulse generator 205 to the binary circuits 220 and 222. The initial states of the binary circuits 220 and 222 are set so that during the interval when the binary circuit B6 is in the exclusive state, the binary circuit 220 applies a high signal through the conductor 229 to the gate circuit 230. As a result, the gate circuit 230 is qualified, passing reference potential from the terminal 232 to the terminals 240 and 242. Thus, the period P6, indicated in FIGURE 5A, is at a reference potential.

The next pulse from the pulse generator 205 causes the binary circuit B6 to be returned to the common state and the binary circuit B7 to be set into the exclusive state. During the interval when the binary circuit B7 is in an exclusive state, the gate circuits G7 and G7A are qualified, as closed switches, allowing signals from the transducers T7 and T7A respectively to pass through these gate circuits to the output terminals 240 and 242, respectively.

The following pulses from the pulse generator 205 cause the exclusive state to be stepped progressively through the binary circuits B7 through B35, and during the intervals P8, P10, etc., when the even-numbered binary circuits are in the exclusive state, the signal from the binary circuit 220 which appears in conductor 229 is in a high state, qualifying the gate 230 and passing reference potential from the terminal 232 to the terminals 240 and 242.

During intervals P7, P9, etc., when the odd-numbered binary circuits are in the exclusive state, the groups of gate circuits connected to the terminals 242 and 240 are individually and sequentially qualified to allow signals from the transducers to be applied across these output terminals.

It may, therefore, be seen that the system of FIGURE 5 functions to provide an initial interval during each cycle of operation, of six intervals P, during which reference potential is applied to the output terminals. Thereafter, the signals from the transducers are sequentially applied to the output terminals but are separated by intervals P, during which reference potential is applied to the output terminals. As a result, the individual component signals in the composite signal are clearly identified and separated and each is referenced to a predetermined level.

Of course, in certain situations it will be desirable to employ the concepts shown and described with respect to FIGURE 3; whereas in other systems it will be desirable to employ concepts described with respect to FIGURE 5, the individual application providing considerations for the determination.

An important feature of the present invention resides in the provision of a static commutator which is small in size, light in weight, and reliable in operation over extended intervals of time.

Another important feature of the present invention resides in the fact that a plurality of individual signals may be sampled and formed into a composite signal wherein the individual signals are not effected by one another.

Still further distinct advantage resulting from the present invention resides in an arrangement for referencing a composite signal formed of a plurality of sequential signals in which the composite signal is returned to a reference level after each of the component signals.

It should be noted that although the particular embodiment of the invention herein shown and described is fully capable of providing the advantages and achieving the objects herein previously set forth, such embodiments are merely illustrative and this invention is not to be limited to the details of construction illustrated and described herein except as defined by the appended claims.

I claim:

1. A static commutator for sequentially coupling information signals individually to a common circuit comprising: a plurality of binary circuits having first and second stable states; a source of pulses having an output coupled to each of said binary circuits; interconnecting means for said binary circuits for progressively placing said binary circuits exclusively in said first stable state in response to pulses from said sources, resistance means connected across the output of each of said binary circuits; a plurality of bipolar transistor switches, each bipolar switch including a pair of transistors having base electrodes connected to one point on said resistance means and collector electrodes connected to another point on said resistance means, each of said transistors having an emitter electrode, the emitter electrode of one transistor in each pair being connected to the common circuit; and means for applying information signals to the emitter electrodes of the remaining transistors in said bipolar switches, whereby the information signals passed by said bipolar switches are applied to said common circuit.

2. Apparatus according to claim 1 wherein each of said binary circuits comprises a pair of transistors having electrodes interconnected to permit only one of said transistors to be conductive when said binary circuit is in a stable state.

3. Apparatus according to claim 2 wherein each of said bipolar transistor switches comprise a pair of transistors interconnected to permit signals to pass through both of said transistors when the associated binary circuit is in said first stable state.

4. A static commutator for sequentially coupling signals individually to a common circuit comprising: a plurality of binary circuits having first and second stable states, each binary circuit including a pair of transistors having electrodes interconnected to permit only one of said transistors to be conductive when said binary circuit is in a stable state; a source of pulses having an output coupled to each of said binary circuits; interconnecting means for said binary circuits for progressively placing said binary circuits exclusively in said first stable state in response to pulses from said source; a plurality of bipolar transistor switches of lesser number than said plurality of binary circuits, each bipolar transistor switch being respectively connected to one of said binary circuits and including a pair of transistors interconnected to permit signals to pass through both of said transistors only when the associated binary circuit is in said first stable state; means for applying information signals to each of said transistor switches; means for coupling said plurality of transistor switches to the common circuit; and means for connecting said common circuit to a source of reference potential during intervals when those binary circuits that are not connected to a transistor switch are in said first stable state.

5. Apparatus according to claim 4 wherein each binary circuit connected to a transistor switch is placed in said first state after a binary circuit not coupled to a transistor switch is placed in said first stable state.

6. Apparatus according to claim 4 further including a plurality of signal sources; and a second plurality of bipolar transistor switches respectively connected between a signal source and a second common circuit, said second plurality of transistor switches being individually controlled by said binary circuits.

7. In combination: a plurality of binary switches, each comprising a pair of transistors having base, emitter and collector electrodes; a source of pulses coupled to the base electrode of one transistor in each binary switch; a source of potential coupled between the emitter and collector electrodes of the transistors of each switch; a capacitive connection between the collector electrode of the other transistor of each switch and the base electrode of said one transistor in a different switch; respective resistor-capacitor networks connected between the collector electrode of each transistor and the base electrode of the other transistor in each switch; resistance means connected across the collector electrodes of the transistors of each switch; a plurality of gate circuits, each including a pair of transistors having base electrodes connected to one point on said resistance means, and collector electrodes connected to another point on said resistance means, said transistors of said gate circuits having emitter electrodes, one emitter electrode of a transistor in each pair being connected to a common output lead; and means to apply signals to the emitter electrodes of the remaining transistors in said gate circuits.

References Cited in the file of this patent

UNITED STATES PATENTS 2,199,634 Koch ---------------- May 7, 1940

(Other references on following page)

UNITED STATES PATENTS

| | | |
|---|---|---|
| 2,413,440 | Farrington | Dec. 31, 1946 |
| 2,442,403 | Flory et al. | June 1, 1948 |
| 2,465,355 | Cook | Mar. 29, 1949 |
| 2,483,411 | Grieg | Oct. 4, 1949 |
| 2,627,039 | Mac Williams | Jan. 27, 1953 |
| 2,651,718 | Levy | Sept. 8, 1953 |
| 2,657,318 | Rack | Oct. 27, 1953 |
| 2,673,936 | Harris | Mar. 30, 1954 |
| 2,825,889 | Henle | Mar. 4, 1958 |
| 2,889,537 | Elliott | June 2, 1959 |
| 2,899,570 | Johannesen | Aug. 11, 1959 |
| 2,906,869 | Kramskoy | Sept. 29, 1959 |
| 2,931,922 | Tubinis | Apr. 1, 1960 |
| 2,936,338 | James | May 10, 1960 |

OTHER REFERENCES

The Development of an Electronic Commutator by Hardy C. Martel, submitted for Master's Degree at M.I.T., 1950 (pp. 4–22).

The Development of a High Speed Triode Tree Electronic Commutator by Paul Wolfe Cooper, submitted for Master's Degree at M.I.T., pages 9, 11, 1951.

"Junction Transistors Used as Switches" by Brights, March 1955, A.I.E.E. Transactions, part I, Communications and Electronics, vol. 74, No. 1, pages 119–120.

UNITED STATES PATENT OFFICE

CERTIFICATE OF CORRECTION

Patent No. 3,082,330 March 19, 1963

Thomas C. Ward

It is hereby certified that error appears in the above numbered patent requiring correction and that the said Letters Patent should read as corrected below.

Column 3, line 22, for "sequently" read -- sequentially --; column 6, line 51, for "phenomenon" read -- phenomen --; column 9, line 66, for "sources," read -- source; --.

Signed and sealed this 8th day of October 1963.

;EAL)
ttest:

EDWIN L. REYNOLDS

ǃNEST W. SWIDER
ttesting Officer

Acting Commissioner of Patents